Oct. 28, 1924.  W. S. CUNNINGHAM  1,513,694
TRANSMISSION
Filed July 31, 1923   3 Sheets—Sheet 2
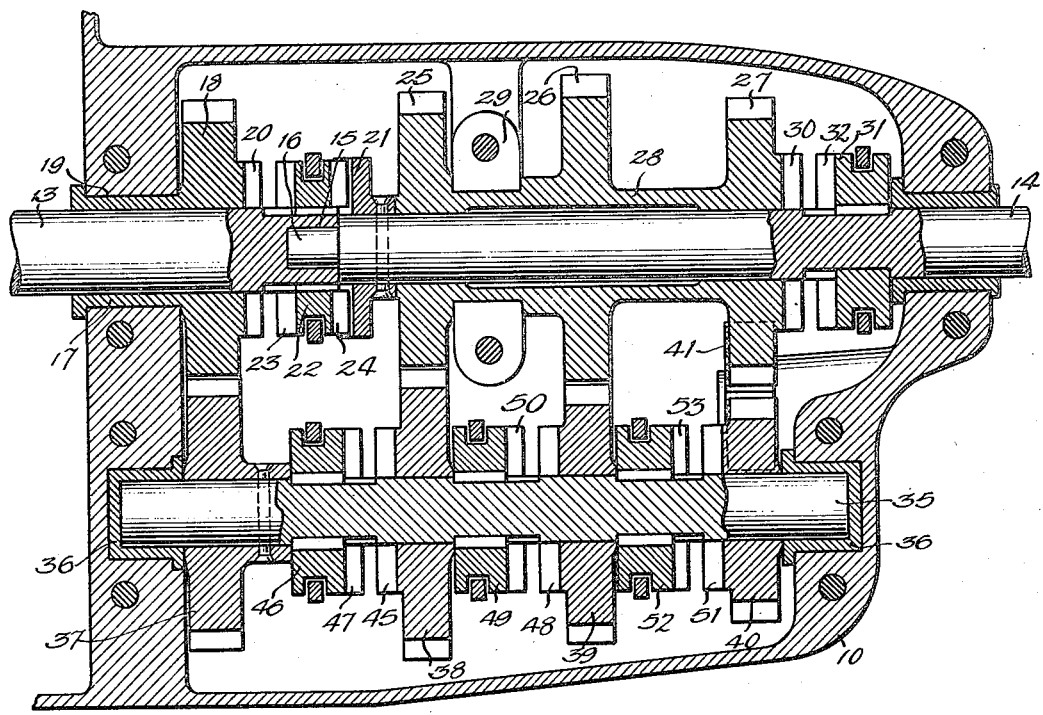
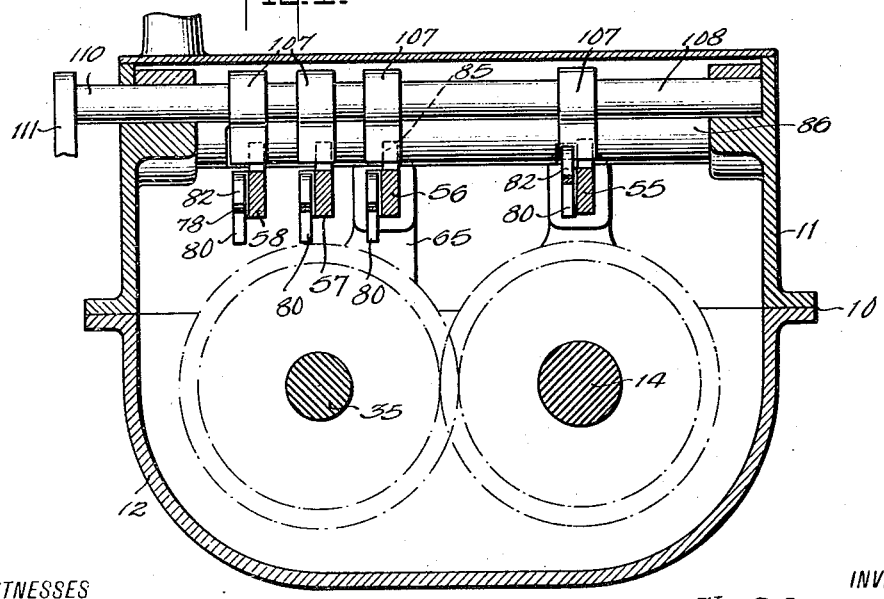
WITNESSES
Frederick Diehl
Hugh H. Ott
INVENTOR
WM. S. CUNNINGHAM
BY
ATTORNEYS Oct. 28, 1924.
W. S. CUNNINGHAM
TRANSMISSION
Filed July 31, 1923   3 Sheets—Sheet 3
1,513,694
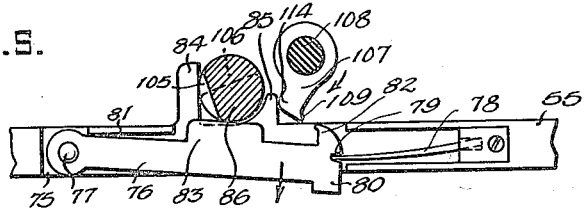
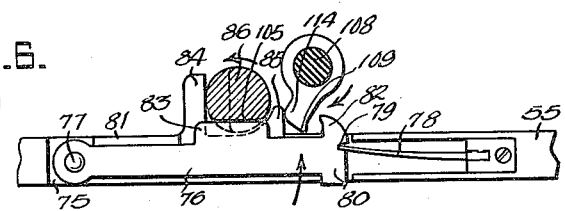
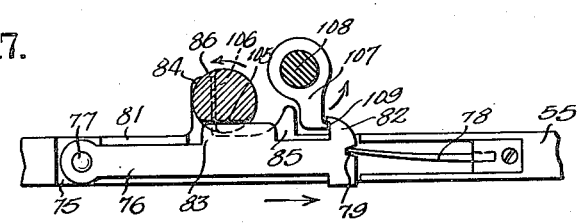
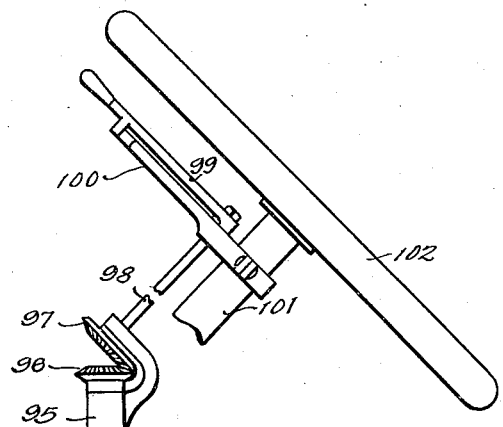
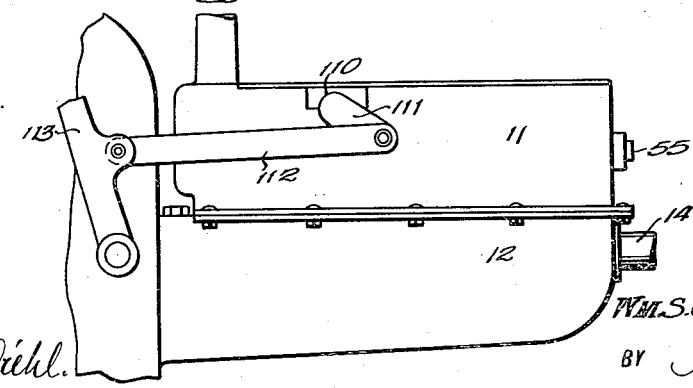
WITNESSES
INVENTOR
WM. S. CUNNINGHAM
BY
ATTORNEYS Patented Oct. 28, 1924.

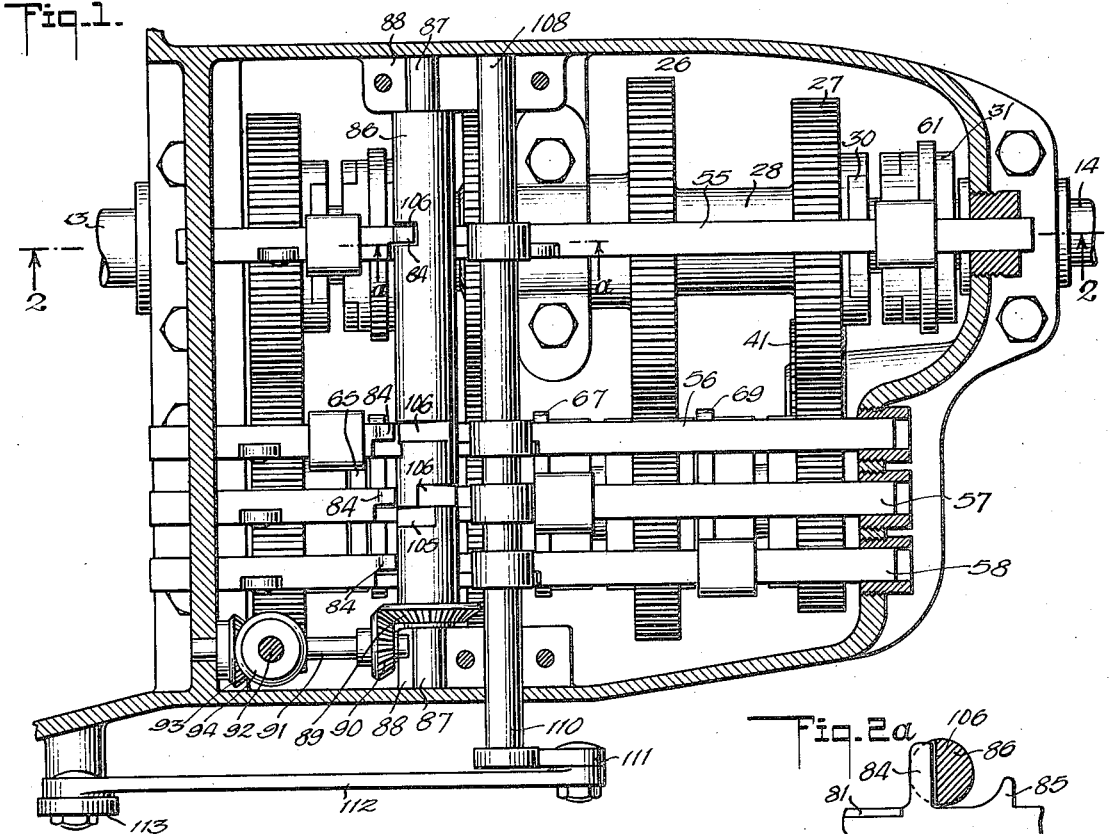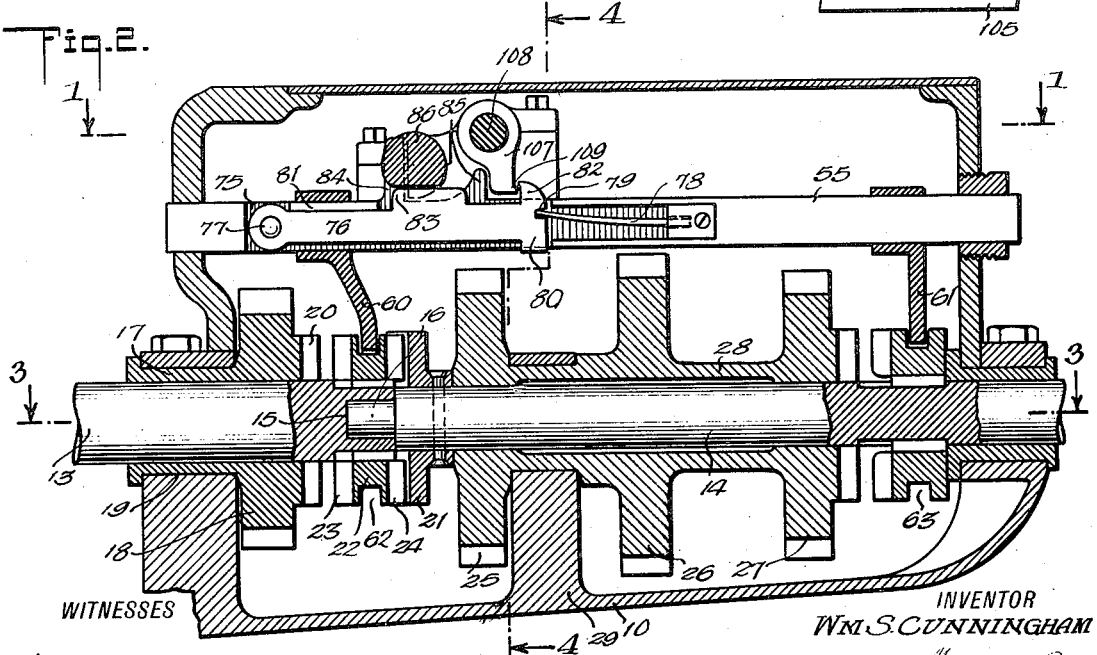

1,513,694

UNITED STATES PATENT OFFICE.

WILLIAM STANTON CUNNINGHAM, OF SHREVEPORT, LOUISIANA.

TRANSMISSION.

Application filed July 31, 1923. Serial No. 654,900.

*To all whom it may concern:*

Be it known that I, WILLIAM S. CUNNINGHAM, a citizen of the United States, and a resident of Shreveport, in the parish of Caddo and State of Louisiana, have invented a new and Improved Transmission, of which the following is a full, clear, and exact description.

This invention has relation to a power transmission mechanism and refers more particularly to a change speed gearing for motor vehicles or the like, the same being in the nature of an improvement over my copending application Serial No. 449,309.

The present improvement is particularly directed to the selective controlling mechanism for obtaining the various speed ratios between a driving and driven shaft in speed change gearing of the constantly meshing type.

One of the outstanding objects of the present invention resides in the provision of a clutch lever operated means for setting the gears.

As a further object the invention contemplates in combination with a power transmission including a driving shaft, a change speed gearing and a clutch for coupling the same, of manually operable means for selecting a speed, and a common means for successively setting the gears of the speed ratio selected and for rendering the clutch active whereby to positively preclude the possibility of stripping of the gears or injury or strain to the elements of said transmission.

The invention further contemplates a selective control mechanism which is especially designed for operating the speed change gearing of a motor vehicle which includes reversing gears.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a sectional plan view of a power transmission constructed in accordance with the invention, the same being taken approximately on the line indicated at 1—1 in Fig. 2.

Fig. 2 is a longitudinal sectional view taken approximately on the line indicated at 2—2 in Fig. 1.

Fig. 2ª is a fragmentary sectional view taken approximately on the line *a—a* of Fig. 1.

Fig. 3 is a horizontal sectional view taken approximately on the line 3—3 of Fig. 2.

Fig. 4 is a transverse sectional view taken approximately on the line 4—4 of Fig. 2.

Figs. 5, 6 and 7 are fragmentary diagrammatic views illustrating the operation of the selective controlling means.

Fig. 8 is a fragmentary side elevation illustrating the general assembly of the transmission with the complementary elements of the motor vehicle.

Referring to the drawings by characters of reference, 10 designates a transmission housing having upper and lower sections 11 and 12 detachably secured together to admit of the assembly and access to the interior thereof. 13 and 14 designate respectively the drive shaft and driven shaft, the former being operatively associated with an engine or prime mover, not shown, and the latter connected to the drive wheels or driving member of the vehicle. The said shafts are disposed in axial alignment and extend longitudinally through the housing 10. The drive shaft 13 is provided with a concentric bearing opening or ears 15 at its inner end to receive the concentric trunnion 16 of the driven shaft 14 which projects from the inner end of said driven shaft whereby positive axial alignment of said shafts is insured. The drive shaft extends through the sleeve 17 of a gear 18 loosely mounted on the drive shaft with the sleeve loosely mounted in the bearing opening 19 in the end wall of the housing 10, said gear 18 being provided on its inner face with a clutch member 20.

The inner or forward extremity of the driven shaft 14 is provided with a clutch member 21 confronting and suitably spaced from the clutch member 20. The inner or rear extremity of the drive shaft has splined thereon a double faced sliding clutch member 22 provided on its opposite sides with clutch teeth 23 and 24. A driven speed gear unit consisting of driven speed gears 25, 26 and 27 integrally cast or otherwise secured on a hollow shaft 28, is loosely mounted on the driven shaft in rear of the clutch member 21, said sleeve being mounted in a bearing 29 to prevent longitudinal relative movement of the same within the housing. The rear extremity of the hollow shaft 28 of the driven speed gear unit is provided with clutch teeth 30. An axially shiftable clutch member 31 having clutch teeth 32 confronting the clutch teeth 30 is splined on the drive shaft 14 in rear of the driven speed gear unit. A counter shaft 35 is disposed longitudinally within the housing at one side of the shafts 13 and 14 and parallel thereto, the same being supported at its opposite ends in the bearings 36 mounted in the opposite end walls of the housing. A gear or pinion 37 is keyed on the counter shaft at the forward end thereof, the teeth of the same meshing with the teeth of the gear 18. Drive gears or pinions 38, 39 and 40 are loosely mounted on the counter shaft in spaced relation with the teeth thereof respectively meshing with the teeth of the driven speed gears 25 and 26 and the teeth of an idler gear 41, which in turn meshes with the teeth of the driven speed gear 27. The pinion 38 is provided on its forward side face with the clutch teeth 45. An axially shiftable clutch member 46 is splined on the counter shaft and interposed between the pinions 37 and 38, the same being provided on its rear face with clutch teeth 47. The pinion 39 is provided on its forward side face with clutch teeth 48 and an axially shiftable clutch member 49 having clutch teeth 50 on its rear face is splined on the counter shaft and interposed between the pinions 38 and 39. The pinion 40 is provided on its forward side face with clutch teeth 51 and an axially shiftable clutch member 52 having clutch teeth 53 on its rear face is splined on the counter shaft and interposed between the pinions 39 and 40. The pinion 38 and driven gear 25 constitute an intermediate speed driving ratio, the pinion 39 and driven gear 26 constituting the low speed ratio and the pinion 40, idler 41 and driven gear 27 constitute the reverse drive. The mechanism for selectively coupling the drive and driven shafts 13 and 14 includes a plurality of slide bars 55, 56, 57 and 58 having their opposite extremities respectively mounted in the end walls of the housing. The slide bar 55 is arranged in superposed relation to the drive and driven shafts 13 and 14 and has secured thereto shifting forks 60 and 61 which depend therefrom and respectively engage the grooves 62 and 63 of the clutch members 22 and 31 whereby said clutch members will be simultaneously shifted in the same direction upon shifting of the slide bar 55. The slide bars 56, 57 and 58 are arranged parallel and in superposed relation to the counter shaft. The slide bar 56 is provided with a depending shifting fork 65 received by a groove in the clutch member 46. The slide bar 57 is provided with a depending fork 67 which is received by a groove in the clutch member 49. The slide bar 58 is provided with a depending shifting fork 69 received by a groove in the clutch member 52. Each slide bar is provided in one of its side faces with a recess 75 within which a connector latch 76 is pivoted at one end as at 77 for vertical swinging movement of its opposite end. A leaf spring 78 cooperates with a notch 79 in the head 80 at the free end of the connector latch to normally swing the same in an upward direction where it is arrested against further movement by a stop 81. The head 80 is provided with a nose 82 which when the latch 76 is thrown to its uppermost position projects above the upper surface of the slide bar. Medially of its length the latch is provided with an upwardly projecting portion 83, the purpose of which will be hereinafter set forth. Each slide bar is formed with spaced upwardly projecting lugs 84 and 85. A transversely disposed selector shaft 86 having journals 87 at its opposite ends mounted in journal bearings 88 is provided and said selector shaft has secured thereto adjacent one end a beveled gear 89 which meshes with a beveled pinion 90 on a right angularly disposed shaft section 91. The shaft section 91 is rotated from a vertical shaft 92 through the medium of the meshing miter gears 93 and 94. The shaft 92 extends through a tubular housing 95 and is provided at its upper end with a beveled gear 96 meshing with a beveled gear 97 at the lower end of a shaft 98 which shaft has secured to its upper end a manipulating lever 99 movable over a sector plate 100 clamped or otherwise secured upon the steering column 101 and lying immediately beneath the steering wheel 102. The selector shaft 86 is provided adjacent each connector latch with a peripheral notch 105 and in alignment with the stop lug 84 a peripheral notch 106 is provided, said notches being substantially at right angles to each other. The notches 105 and 106 are spaced circumferentially at different relative positions on the selector shaft in order that the said notches will cooperate with the connector latches and stop lugs 84 of each slide bar at different points in the rotation of the selector shaft 86. When the lever 99 is manipulated to a proper position indicated by suitable indicia on the sector plate 10, the notches 105 and 106 will be disposed in a position as illustrated in Fig. 6 to allow the upwardly projecting portion 83 to be received by the notch 105, the spring 78 functioning to swing the latch 76 upwardly. At the same time the corresponding notch 106 will be brought into alignment with the stop lug 84 thus permitting a limited free rearward sliding movement of the slide bar 55. The means for moving each slide bar consists of a radially projecting foot 107 secured on a transverse rock shaft 108, one foot 107 being provided for each slide bar. The foot is provided with a toe 109 which is designed to cooperate with the nose 82 of the connector latch head 80 when the latter is swung upwardly to the limit of its movement. The toe engages the nose of the latch and moves the slide bar rearwardly only when the rock shaft 108 is rotated in a direction to move the foot rearwardly and when the connector latch is swung upwardly. The rock shaft 108 projects at one end 110 from the side of the transmission housing and said projecting end is provided with an arm 111 which is connected by a link 112 to the clutch lever 113 whereby rearward movement of the clutch lever to render the clutch active rocks the feet 107 rearwardly. It is, of course, understood that the clutch lever 113 is normally swung rearwardly to render the clutch active under the action of a spring in the usual manner. When the operator moves the clutch lever forwardly under foot pressure the shaft 108 is rocked in the opposite direction so that the heel 114 of the foot engages with the lug 85 which moves the slide rod which has been previously moved to rearward position forwardly to return said slide rod to its normal forward position, thereby again moving the lug 84 out of the notch 106 whereupon a further manipulation of the hand lever 99 the selector shaft may be rotated to bring the notches 105 and 106 into alignment with the upwardly projecting portion 83 or stop lug 84 of one of the other slide rods or as in the neutral position to dispose all of the notches out of alignment with their coacting elements. The front curved face of the lug 85 acts as a stop to prevent accidental movement of the slide bars beyond a predetermined normal position. As illustrated in Fig. 1 it will be seen that the selector shaft has been rotated to a position to dispose the notch 106 in alignment with the stop lug 84 of the slide rod 55 which has been moved rearwardly by the movement of the clutch lever to connect the clutch member 22 with the clutch member 21 for direct driving. It will be further observed in this figure that the remaining notches 106 are out of alignment with the stop lugs 84 as are the notches 105 which cooperate with the upwardly projecting portions 83 so that the noses 82 of the connector latches of the slide bars 56, 57 and 58 are disposed in a lowered position as illustrated in Fig. 5, whereby the toes 109 of the cooperating feet 107 will not engage therewith and therefore fail to move said slide bars 56, 57 and 58. The operation is such that the movement of the clutch lever 113 to its rearward position is so timed that the rock shaft 108 is fully rocked to its rear position prior to the actual clutching of the clutch so that the gears are set prior to the power actuating the transmission. This obviates the stripping of the clutch teeth or strain on the parts during the gear shifting operation.

I claim:

1. The combination with a variable speed transmission which includes drive, driven and counter shafts, and a speed change mechanism comprising a plurality of independently operable elements, means for coupling said elements with the counter shaft, a speed changing unit loosely mounted on the driven shaft having a plurality of complementary speed changing elements constantly engaging the counter shaft speed changing elements, means operable by movement of the clutch lever to clutching position, to couple the drive and driven shafts for direct driving and for simultaneously effecting uncoupling of the driven shaft speed changing elements and the uncoupling of the counter shaft with the driven shaft, of manually operable mechanism for normally holding all of said means inactive upon letting-in of the clutch, said mechanism being manually operable to selectively release any one of said means, said mechanism comprising slide bars respectively connected with the speed changing elements, a connector latch on each slide bar, a rotary clutch operated shaft having a plurality of feet secured thereto respectively for cooperation with each latch to move the slide bars in an actuating direction, a rotary manually operable selector shaft having notches, and lugs on each connector latch and slide bar cooperating with the notches to release the slide bar and permit the foot to coact with the corresponding connector latch of the speed selected.

2. The combination with a variable speed transmission which includes drive, driven and counter shafts, and a speed change mechanism comprising a plurality of independently operable elements, means for coupling said elements with the counter shaft, a speed changing unit loosely mounted on the driven shaft having a plurality of complementary speed changing elements constantly engaging the counter shaft speed changing elements, means operable by movement of the clutch lever to clutching position, to couple the drive and driven shafts for direct driving and for simultaneously effecting uncoupling of the driven shaft speed changing elements and the coupling of the counter shaft with the driven shaft, of manually operable mechanism for normally holding all of said means inactive upon letting-in of the clutch, said mechanism being manually operable to selectively release any one of said means, said mechanism comprising slide bars respectively connected with the speed changing elements, a connector latch on each slide bar, a rotary clutch operated shaft having a plurality of feet secured thereto respectively for cooperation with each latch to move the slide bars in an actuating direction, a rotary manually operable selector shaft having notches, lugs on each connector latch and slide bar cooperating with the notches to release the slide bar and permit the foot to coact with the corresponding connector latch of the speed selected, and means operable by and upon movement of the clutch lever to render the clutch inactive, for returning to normal position the slide bar previously moved.

3. In a selective controlling means for speed change gearing, a plurality of slide bars each having spaced lugs projecting from one side thereof, a transverse rotary selector shaft mounted between said lugs, connector latches pivoted to said slide bars having a projection for engaging the periphery of the selector shaft, means for normally swinging the connector latches to engage the projections with the periphery of the selector shaft, a rock shaft traversing said slide bars having a radial foot provided with a heel and toe, and a nose at the free end of the connector latch and said selector shaft having a pair of notches adjacent each slide bar, the notches of each pair being at substantially a right angle to respectively receive therein the projection on the connector latch and one of the lugs on the slide bar when the selector shaft is rotated to aline therewith whereby the nose of the connector latch will be disposed in the path of rocking movement of the toe of the foot to engage and move the slide bar upon rocking of the rock shaft, the said notch for the lug on the slide bar permitting of the sliding movement of said slide bar, the heel of the foot adapted to coact with the remaining lug upon rocking of the rock shaft in the opposite direction to return the slide bar to normal position.

4. In a selective controlling means for speed change gearing, a plurality of slide bars each having spaced lugs projecting from one side thereof, a transverse rotary selector shaft mounted between said lugs, connector latches pivoted to said slide bar having a projection for engaging the periphery of the selector shaft, means for normally swinging the connector latches to engage the projections with the periphery of the selector shaft, a rock shaft traversing said slide bars having a radial foot provided with a heel and toe, and a nose at the free end of the connector latch and said selector shaft having a pair of notches adjacent each slide bar, the notches of each pair being at substantially a right angle to respectively receive therein the projection on the connector latch and one of the lugs on the slide bar when the selector shaft is rotated to aline therewith whereby the nose of the connector latch will be disposed in the path of rocking movement of the toe of the foot to engage and move the slide bar upon rocking of the rock shaft, the said notch for the lug on the slide bar permitting of the sliding movement of said slide bar, the heel of the foot adapted to coact with the remaining lug upon rocking of the rock shaft in the opposite direction to return the slide bar to normal position, the rock shaft having connection with the clutch lever.

5. In a selective controlling means for speed change gearing, a plurality of slide bars each having spaced lugs projecting from one side thereof, a transverse rotary selector shaft mounted between said lugs, connector latches pivoted to said slide bar having a projection for engaging the periphery of the selector shaft, means for normally swinging the connector latches to engage the projections with the periphery of the selector shaft, a rock shaft traversing said slide bars having a radial foot provided with a heel and toe, a nose at the free end of the connector latch and said selector shaft having a pair of notches adjacent each slide bar, the notches of each pair being at substantially a right angle to respectively receive therein the projection on the connector latch and one of the lugs on the slide bar when the selector shaft is rotated to aline therewith whereby the nose of the connector latch will be disposed in the path of rocking movement of the toe of the foot to engage and move the slide bar upon rocking of the rock shaft, the said notch for the lug on the slide bar permitting of the sliding movement of said slide bar, the heel of the foot adapted to coact with the remaining lug upon rocking of the rock shaft in the opposite direction to return the slide bar to normal position, the rock shaft having connection with the clutch lever, and means for manually rotating the selector shaft to bring the pairs of notches in registry with the lugs of any one of the slide bars and the projections of the connector latch thereof.

WILLIAM STANTON CUNNINGHAM.